United States Patent [19]

Cantabery

[11] Patent Number: 4,870,880
[45] Date of Patent: Oct. 3, 1989

[54] BAR STOCK FEED MECHANISM FOR MACHINE TOOL

[76] Inventor: Fredrick L. Cantabery, Rte. 3, Box 578K, Muscatine, Iowa 52761

[21] Appl. No.: 267,401

[22] Filed: Nov. 4, 1988

Related U.S. Application Data

[63] Continuation of Ser. No. 121,376, Nov. 16, 1987, abandoned.

[51] Int. Cl.$^4$ .............................................. B23B 13/00
[52] U.S. Cl. ........................................ 82/124; 82/162; 82/163
[58] Field of Search ............. 82/2.5, 124, 38 R, 38 A, 82/163 X; 414/14, 15, 16, 17

[56] References Cited

U.S. PATENT DOCUMENTS

| | | | |
|---|---|---|---|
| 4,061,061 | 12/1977 | Lahm et al. | 82/2.5 |
| 4,217,800 | 8/1980 | Furegati | 82/2.5 |
| 4,221,141 | 9/1980 | Oliver | 82/2.5 |
| 4,624,612 | 11/1986 | Geber et al. | 82/2.5 |
| 4,672,869 | 6/1987 | Hasslauer et al. | 82/2.5 |

FOREIGN PATENT DOCUMENTS

| | | | |
|---|---|---|---|
| 2852627 | 7/1979 | Fed. Rep. of Germany | 82/2.5 |
| 2075877 | 11/1981 | United Kingdom | 82/2.5 |

Primary Examiner—Robert P. Olszewski
Assistant Examiner—Lawrence Cruz
Attorney, Agent, or Firm—Henderson & Sturm

[57] ABSTRACT

A bar stock feed mechanism includes a filler tube having provision for coaxial alignment with an attachment to the rotatable work receiver of a lathe, for example, and is adapted to coaxially receive a section of bar stock for incremental feeding to the chuck of the lathe. The tube, at its end portion axially remote from the chuck contains a piston adapted to abut the proximate end of the bar stock, and the piston is pressurized for advancing the stock. Filler tubes are provided in several diameters for accommodating several sizes of bar stock. In the event of bar stock of substantial length, the filler tube is surrounded by a concentric extension tube which rotates with the tube and chuck or equivalent work receiver of the machine or lathe.

4 Claims, 2 Drawing Sheets

BAR STOCK FEED MECHANISM FOR MACHINE TOOL

This application is a continuation of my application Ser. No. 07/121,376, filed Nov. 16, 1987 (now abandoned).

BACKGROUND AND SUMMARY OF THE INVENTION

The prior art is replete with examples of mechanism for feeding bar stock to lathes and like machines. Most prior feeders are complicated and provided in the form of stands for supporting bar stock adjacent to the lathe, and these feeders also include fluid-pressure means for advancing the stock. The present invention differs from the art primarily in supporting the bar stock in a filler tube coaxially within and affixed to the work receiver or spindle of the lathe and further in equipping the tube with a fluid-pressurizable piston abutting the proximate end of the stock so as to advance the stock through the receiver or chuck of the machine. It is found advantageous to adapt the feed mechanism for use with shorter lengths of bar stock than heretofore employed, thus eliminating the need for expensive and cumbersome auxiliary supports for the over-hanging stock.

It is a significant feature of the invention to provide the bar-stock-carrying or filler tube as a coaxial adjunct to the rotatable work receiver of the lathe or equivalent machine and further to provide this tube as one of several tubes of different diameters for accommodating bar stock of different diameters. Also, the tube may be provided in different forms for utilization with receivers or chucks of different designs. The designs according to the invention are simple, easily attached to different types of machines and readily interchangeable for the accommodation of bar stock of different diameters.

Further features and advantages of the invention will appear as preferred embodiments thereof are disclosed in the ensuing description and accompanying drawings.

DESCRIPTION OF A PREFERRED EMBODIMENT OF THE INVENTION

Figure 1:
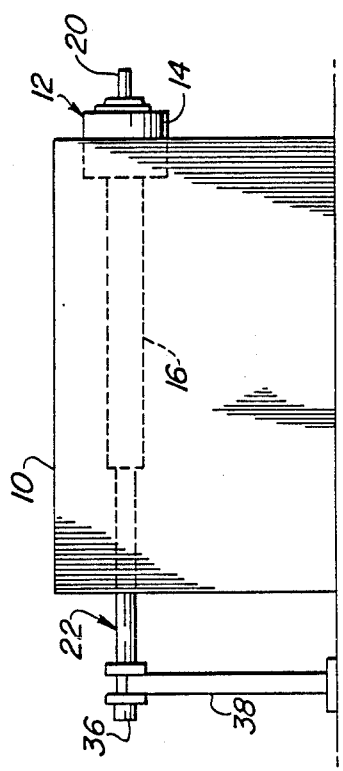
FIG. 1 is a reduced-scale illustration of a typical machine in which the invention finds particular utility.
Figure 2:
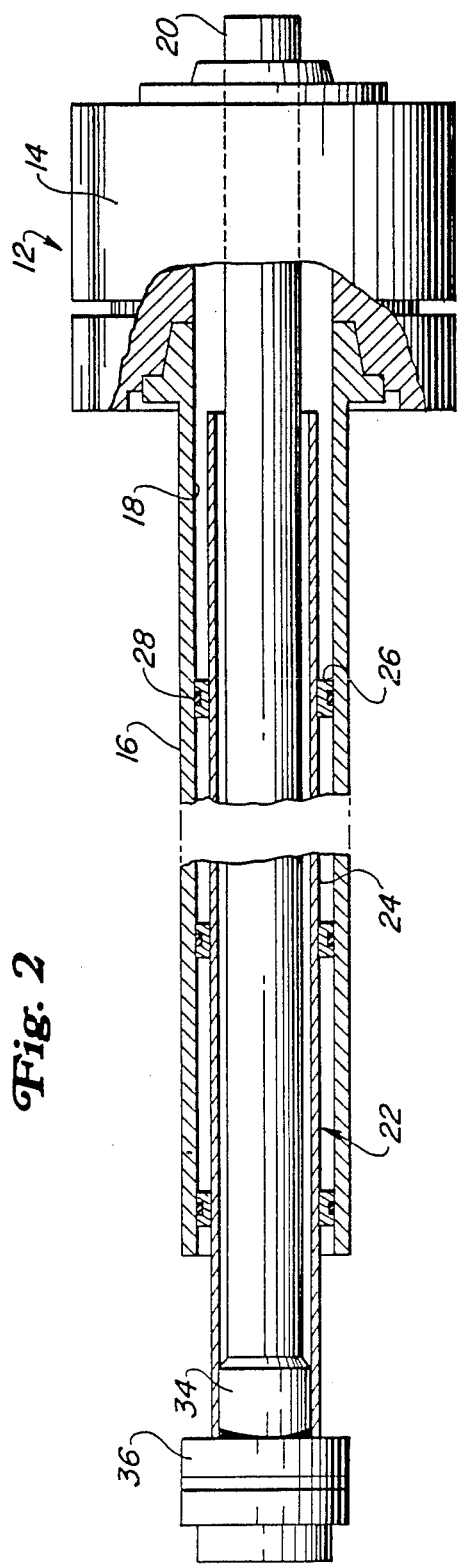
FIG. 2 is an enlarged section, with portions omitted to fore-shorten the view, and showing one form of the invention.

In FIG. 1, a representative form of metal-working machine, such as a lathe, is designated by the numeral (10) and has a work-receiver (12) including a chuck (14) and an elongated spindle (16) attached to the chuck for rotation of the chuck and spindle together about a horizontal axis, suitable bearings (not shown) being provided for accurate journaling of the work-receiver. As best seen in FIG. 2, the spindle is of elongated tubular construction and its cylindrical interior provides an axial bore (18) which is of course coaxial with the center on which the chuck jaws are based. Conventionally, bar stock of cylindrical section, as at (20), is fed axially through the spindle and into the chuck jaws in increments according to the type of work being done.

According to the present invention, filler tube means (22) extends coaxially through the spindle and in this case terminates at its front end at about the junction of the chuck and front end of the spindle. In one type of machine, the filler tube means will project rearwardly beyond the rear end of the spindle, as shown in FIGS. 1 and 2. This type of arrangement is used in cases of certain types of rear-disposed chuck control, such as a draw tube, etc. (not shown, being omitted here in the interests of clarity).

Figure 5:
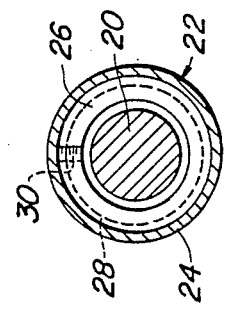
FIG. 5 is a transverse view showing one form of mounting a spacer ring to the filler tube.
Figure 4:
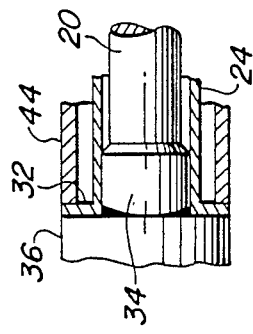
FIG. 4 is a fragmentary section showing one form of means securing the filler tube to the receiver or extension of receiver.

The filler tube means comprises essentially a central tube (24) concentrically received within a major portion of the spindle (16), and further includes means for maintaining the concentricity of the two parts, here comprising a plurality of spacer rings (26) spaced axially apart along the tube (24). The tube has an inside diameter tolerably greater than the O.D. of the bar stock being transported but, since the tube, bar stock and spindle rotate in unison, there is no requirement for a bearing or bearing surface between the I.D. of the tube and the O.D. of the bar stock. In the present drawings, the clearance between the O.D. of the bar stock and the I.D. of the filler tube (22) is shown in exaggerated fashion in the interests of clarity. The bar stock rotates with the chuck and spindle because, except when it is axially advanced as will appear later, it is gripped by the chuck jaws. The filler tube means rotates with the spindle by virtue of a connection between the two, which, by way of examples, may be as in FIGS. 2 and 5 or as in FIG. 4. In FIGS. 2 and 5, each ring has an annular groove in which friction means is carried, such as an 0-ring (28), and the rings are fixed to the tube (24) as by set screws (30) (FIG. 5); although, other means of affixation may be resorted to; e.g., tack welding, etc. In the FIG. 4 example, the rear end of the tube is shown as having a flange (32) received between the spindle or spindle extension and secured thereto in any suitable fashion.

It is a feature of the invention that the filler tube means can be provided in several diametrical sizes in order to accommodate bar stock of different diameters. In all cases of interchangeability, each filler tube means will have its own spacer rings because, of course, the I.D. of the rings will vary according to the O.D. of the filler tube selected.

Figure 3:
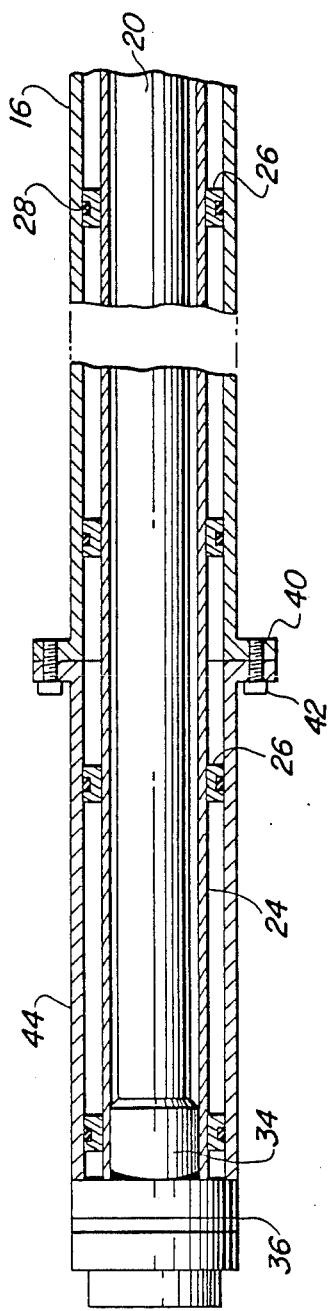
FIG. 3 is an abbreviated section showing an adjunct to the invention.

For the purpose of advancing the section of bar stock, the rear end of the filler tube means carries a piston (34). The bar stock stops short of the rear end of the tube and the piston abuts the end of the stock. Fluid under pressure, preferably pneumatic, is supplied to the rear of the piston from any suitable source (not shown) by means of a typical rotary coupling (36), one known example of which is distributed by the Dueblin Company of Northbrook, IL 60062. Those versed in the art will recognize the union or coupling as enabling rotation of the spindle, tube and bar stock while a portion of the union remains stationary as by being attached to a bracket (38). This bracket affords no support to the filler tube or spindle and merely retains the fixed part of the union (36). As an adjunct to the invention (FIG. 3), the rear end of the spindle (16) is shown as having, by way of example, an annular flange (40) which by means of cap screws (42), is secured to the flanged front end of a tubular spindle extension (44) which carries the rotary union (36). The extension is provided with additional spacer rings like those already described. This part of the invention is particularly adapted to instances where the chuck is of the self-contained type, as distinguished, for example, from those employing a draw tube. With the self-contained chuck, filler tubes of larger I.D. may be used and thus the machine can handle larger-diameter bar stock. Also, the filler tube in this case can have a thinner wall, which leads of course to a larger I.D. The extension becomes in effect part of the spindle (16) and, in many cases, can lead to the use of longer filler tubes. As noted previously herein, the use of the filler tube or filler tube plus extension requires no additional bearings beyond those existing in the basic machine.

IN GENERAL

In both forms of the invention, as well as in equivalents thereof, the construction provides a simple bar stock feed mechanism that eliminates the use of expensive and complicated external stands. Thus, additional bearings are not required, because the basic machine bearings adequately carry the mechanism. The design also embodies accuracy and the minimizing of eccentricity among the machine parts and the bar stock, thus virtually doing away with objectionable vibration, all of which leads to lower maintenance requirements and extended life, besides taking up less space in the area adjacent to the machine. The filler tube itself serves as the piston chamber, thus further simplifying the structure and reducing its costs.

Features other than those pointed out will readily occur to those versed in the art on the basis of the present disclosure, as will many modifications in the preferred embodiments, all without departure from the spirit and scope of the invention.

I claim:

1. For use with a machine tool including a work receiver rotatable on a horizontal axis and having an axial through bore for receiving bar stock; bar stock supporting and feed mechanism comprising an elongated tubular spindle coaxial with the work receiver and having a front end affixed to the receiver for rotation with the receiver and further having a rear end relatively remote from the receiver and the interior of the spindle being a coaxial extension of the receiver through bore, an elongate filler tube coaxially loosely received in the spindle and having a front end proximate to the receiver and a rear end proximate to the rear end of the spindle, said filler tube being adapted to coaxially receive bar stock, the inside diameter of the filler tube being tolerably greater than the outside diameter of the bar stock so that the filler tube supports the bar stock while enabling the bar stock to move axially forwardly relative to the filler tube, spacer means including a plurality of rings spaced axially apart and coaxially surrounding and affixed to the filler tube and engaging the interior of the spindle for centering the filler tube within the spindle and also for effecting rotation of the filler tube with the spindle, a piston coaxially within the rear end of the filler tube for abutting the proximate end of the bar stock, and means at the rear ends of the spindle and filler tube for connection to a source of fluid pressure for moving the piston forwardly to advance the bar stock.

2. The bar stock feed mechanism according to claim 1, in which the engagement of the rings with the spindle is effected by frictional means carried respectively by the rings.

3. The bar stock feed mechanism according to claim 1, including a tubular extension coaxial with the spindle and having means for affixation to the rear end of the spindle as a rearward prolongation of the spindle and concentrically surrounding the filler tube.

4. For use with a machine tool including a work receiver rotatable on a horizontal axis and having an axial through bore for receiving bar stock; bar stock supporting and feed mechanism comprising an elongated tubular spindle coaxial with the work receiver and having a front end affixed to the receiver for rotation with the receiver and further having a terminal ear end relatively remote from the receiver and the interior of the spindle being a coaxial extension of the receiver through bore, an elongated filler tube coaxially loosely received in the spindle and having a front end proximate to the receiver and a terminal ear end proximate to the rear end of the spindle, said filler tube having a major portion of its length concentrically surrounded by the spindle and being adapted to coaxially receive bar stock, the inside diameter of the filer tube being but tolerably greater than the outside diameter of the bar stock so that the filler tube supports the bar stock while enabling the bar stock to move axially forwardly relative to the filler tube, spacer means coaxially surrounding and affixed to the filler tube and engaging the interior of the spindle for centering the filler tube within the spindle and also for effecting rotation of the filler tube with the spindle a piston coaxially within the rear end of the filler tube for abutting the proximate end of the bar stock, said filler tube and piston being axially removable from the receiver and spindle for interchangeability with filler tubes and pistons of different inside diameters, and means at the rear ends of the spindle and filler tube for connection to a source of fluid pressure for moving the piston forwardly to advance the bar stock.

* * * * *